United States Patent Office 2,713,856
Patented July 26, 1955

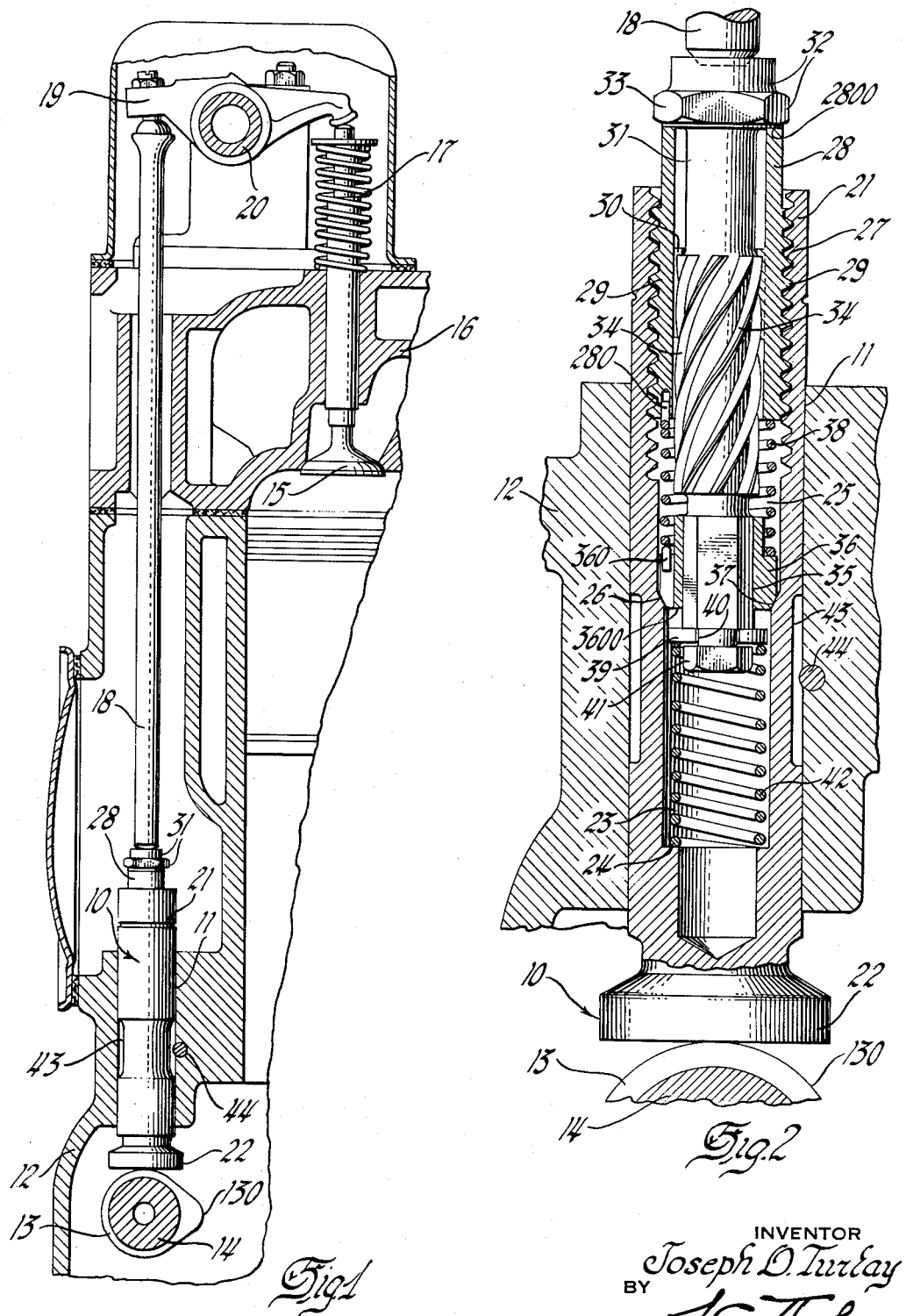

2,713,856

SELF ADJUSTING TAPPET

Joseph D. Turlay, Flint, Mich., assignor to General Motors Corporation, Detroit, Mich., a corporation of Delaware Application December 17, 1953, Serial No. 398,688

7 Claims. (Cl. 123—90)

This invention relates to self adjusting tappets of the mechanical type.

Self adjusting tappets sometimes called valve lifters or valve lash adjusters are employed in internal combustion engines to maintain proper operating clearance between the engine cam shaft and the engine poppet valves. The primary object of this invention is to provide an improved mechanical self adjusting tappet or valve lash adjuster which maintains a predetermined valve operating clearance by automatically and continuously correcting variations from said predetermined clearance caused by wear between the driving and driven parts and by expansion and contraction of the valve mechanism resulting from variations in engine operating temperatures.

Other objects of the invention will become apparent by reference to the following detailed description taken in connection with the accompanying drawing, in which:

Fig. 1 is a fragmentary vertical sectional view of an internal combustion engine showing valve mechanism in which a self adjusting tappet embodying the invention is employed.

Fig. 2 is an enlarged detailed vertical sectional view of the embodiment of the invention shown in Fig. 1.

Referring now to the drawing wherein like numerals refer to like and corresponding parts throughout the several views, a self adjusting tappet 10 embodying the invention is reciprocatingly mounted in a bore 11 of an engine block 12 and is disposed directly over and in contact with a cam 13 on the engine cam shaft 14. Between the self adjusting tappet 10 and the engine poppet valve 15 which is reciprocatingly mounted through the engine head 16 and closed by a compression spring 17 is a push rod 18 and a rocker arm 19, the latter being mounted on a rocker arm shaft 20.

The particular embodiment of the self-adjusting tappet 10 disclosed for the purpose of illustrating the invention has a body member 21 which is headed at its lower end 22 to serve as a cam follower. The body member 21 is internally bored, counter-bored and coarse threaded to provide a spring chamber 23, a spring seat 24, a clutch chamber 25, a clutch seat 26, and relatively flat pitch internal threads 27 to accommodate at its upper end a sleeve element 28. The sleeve element 28 is externally threaded at 29 to mate with the relatively flat pitch internal threads 27 of the body member 21 with a slight axial clearance therebetween.

The sleeve element 28 is helically splined internally at 30 to receive a helically splined screw element 31 headed at its outer end 32 to accommodate the push rod 18 and to provide a seat 33 which may, under certain operating conditions, abut against the annular outer end 2800 of the sleeve element 28. The external helical splines 34 of the screw element 31 mate with internal helical splines 30 of the sleeve element 28 with normal operating clearance therebetween.

The lower portion of the screw element 31 is formed hexagonal at 35 to receive thereon in non-turnable sliding relationship a clutch element 36 having a clutch face 37 formed complementary to the clutch seat 26 within the body member 21. A torsion-compression spring 38 is disposed in spaced relationship within body member 21 around the screw element 31 between the inner end of the sleeve element 28 and the clutch element 36, and is anchored to the said sleeve element 28 and clutch element 36 as indicated by the numerals 280 and 360 respectively. A C-washer 39 is journaled in a circumferential groove 40 located between the hexagonal portion 35 of the screw element 31 and an inner head 41 formed thereon and serves as an upper spring seat for a return compression spring 42 disposed in the spring chamber 23 and seated at its lower end on the spring seat 24. This construction permits the screw element 31 and the clutch element 36 to turn in respect to the return spring 42 without undue resistance against rotation therefrom.

The torsion-compression spring 38 is so wound that it tends to turn the sleeve element 28 outwardly of the body member 21 on the helically splined screw element 31 until the annular outer end or seat 2800 of the sleeve element 28 is brought into contact with the seat 33 disposed under the headed outer end 32 of the tappet screw element 31. The torsion-compression spring 38 is also formed to enable it to serve as a compression spring to constantly urge the clutch face 37 of the clutch element 36 slidably mounted on the hexagonal portion 35 of the screw element 31 against the clutch seat 26 within the body member 21. The return spring 42 has sufficient compressive strength to overcome the compressive force of the torsion-compression spring 38 and urge the screw element 31 to maintain contact with the push rod 18 under all engine running conditions.

The body member 21 is preferably provided with an outer circumferentially grooved portion 43 of sufficient depth to accommodate a detent pin 44 disposed in the engine block 12 to support the self adjusting tappet 10 when the cam shaft 13 is removed from its normal operating position. The length of the circumferential groove 43 is sufficient to permit the desired amount of reciprocation of the self adjusting tappet 10 within bore 11 of the engine block 12.

The particular installation of the self-adjusting tappet 10 in an internal combustion engine indicated in the drawings has been shown for illustrative purposes only, it being obvious that self adjusting tappets embodying the invention may be employed with equal facility in instances where other valve and cam shaft arrangements are employed; for example, when the cam shaft is located above the engine valves, in which case, the rocker arms and push rods would be eliminated and the self adjusting tappet would be reciprocatingly mounted in the engine head between the end of the valve stem and the cam shaft.

Referring now to the illustrative installation of self-adjusting tappets shown in the drawing, self adjusting tappets 10 are positioned in bores 11 in the engine block 12, and the cam shaft 14 and push rods 18 are installed. The sleeve element 28 and screw element 31 of each tappet 10 are together turned inwardly of the body member 21, carrying clutch element 36 with them, until, with the seat 33 of the head 32 of the screw element 31 seated on the annular seat 2800 of the sleeve element, an excessive clearance or valve lash is obtained at the engine valve 15. Upon release, the sleeve element 28 will not turn, but the screw element 31 will be pushed upwardly by the return spring 42 until the headed outer end 32 of the screw element 31 contacts the push rod 18 and all lash between the push rod 18 and the valve 15 is taken up. As the screw element 31 is lifted to this position, it turns outwardly of the sleeve element 28 as a result of its being helically splined in the sleeve element 28.

Assuming, for example, that the axial flat pitch thread clearance between the internal threads 27 of the body member 21 and the external mating threads 29 of the sleeve element 28 is .010", the excessive valve lash is divided between the flat pitch thread clearance of .010" and the clearance between the tappet screw element seat 33 and the sleeve element annular seat 2800. As the cam 13 starts to lift the self adjusting tappet 10 by its body 21 with the screw element in contact with the push rod 18, the .010" lash in the mating flat pitch threads 27 and 29 is first taken up. Further movement of the cam 13 closes the clearance between seat 33 of the head 32 of the screw element 31 and the annular seat 2800 at the top of the sleeve element 28. During this latter movement the clutch seat 26 in the body member forces the clutch element 36 upwardly on the lower hexagonal portion 35 of the screw element 31, and the resulting frictional resistance between the clutch element face 37 and the clutch seat 26 resists relative rotation of the screw element 31 within the body sleeve element 28 at this time, and, since the sleeve element 28 is forced upwardly on the screw element 31, the sleeve element 28 is rotated a small fraction of a turn outwardly of the body member 21 in opposition to the torsion-compression spring 38, thereby reducing excessive valve clearance a small amount. The self adjusting tappet is now solidly compressed with all longitudinal movements thereof taken up, and the engine valve 15 opens and closes as the cam nose 130 passes under the lower headed end 22 of the tappet 21.

After the engine valve 15 seats, further rotation of the cam 13 allows the self adjusting tappet 10 to move downwardly and the sleeve and screw elements 28 and 31 become extended under pressure of the return spring 42 within the limits permitted by the base circle 1300 of the cam 13. The initial extension of .010" occurs at the mating threads 27 and 29 of the body member 21 and sleeve element 28 respectively, and further extension occurs between the sleeve element seat 2800 and the tappet screw element seat 33. During the downward movement of the body member 21, the clutch element 36 is urged downwardly and the clutch face 37 is maintained in light contact with the clutch seat 26 within the body member 21 by the compression feature of the torsion spring 38. This causes the clutch element 36 to slide downwardly on the lower hexagonal portion 35 of the screw element 31, and the sliding friction therebetween reduces the pressure between the mating clutching surfaces 26 and 37 to a minimum whereby to offer little restraint to relative rotation of the screw element 31 and the tappet body element 21 by the torsion-compression spring 38 in relieving the torsional stress created therein during the previous valve opening stroke. Because of the relative pitch diameters and helix angles of the mating threads 27 and 29 and the mating helical splines or threads 30 and 34, such relative rotation results in the screw element 31 turning outwardly of the sleeve element a sufficient amount to take up the remaining excess clearance.

After a number of valve opening and closing cycles, depending upon the amount of initial excess valve clearance, the sleeve element 28 is turned outwardly of the body member 21 sufficiently to take up all of the excess clearance whereupon the seat 33 of the head 32 of the screw element 31 seats on the seat 2800 at the annular outer end of the sleeve element 28. When this position of the screw element 31 has been attained (as shown in Fig. 2), the sleeve element 28 and screw element 31 act as a unit and further "pumping" or reciprocating action of the screw element 31 is eliminated. The sleeve element 28 and body member 21 then have a relative movement of .010" as is permitted by the clearance between the mating flat pitch threads 27 and 29. If, for example, the rocker arm ratio is 1.5 to 1, a valve operating clearance of .015" will be provided.

If, due to differences in engine operating temperature, the valve mechanism elements should expand so that the clearance or lash at the self adjusting tappet 10 becomes less than the .010" thread clearance between the mating flat pitch threads 27 and 29, the external threads 29 on the sleeve 28 will contact the bottom of the internal threads 27 of the body member 21 as the .010" lash is taken up, but the external threads 29 on the sleeve member 28 cannot contact the upper side of internal threads 27 of the body member 21 at the lowest relative position of the sleeve member 28 within the body member 21. The relatively flat pitch of the mating threads 27 and 29 is made sufficiently great so that repeated impact by the sleeve member threads 29 on the lower side of the body member threads 27 will slowly turn the sleeve member 28 into the body member 21 until the clearance is increased to .010" at the tappet.

Although but a single embodiment of the invention has been disclosed in the drawings and described herein, it is obvious that many changes may be made in the size, shape, arrangement and detail of the various elements of the invention, all within the spirit and scope thereof as defined by the appended claims.

I claim:

1. A self adjusting tappet comprising a body member and a sleeve element threaded together with coarse relatively flat pitch threads having an axial clearance whereby to permit a limited predetermined axial movement between said body member and said sleeve element, a screw element helically splined into said sleeve element, clutch means carried by said screw element engageable with said body member, torsion-compression spring means engaged between the sleeve and clutch elements opposing relative rotation between said screw element and said sleeve element and urging said clutch element into engagement with said body member, and return spring means constantly urging said screw and sleeve elements axially outwardly from said body member, said sleeve element being restrained by axial abutment of the mating threads of the body member and sleeve element, said mechanism causing the sleeve element to turn into and out of said body member and adjust the overall length of the tappet upon intermittent application of force axially thereagainst.

2. A self adjusting tappet comprising a body member and a sleeve element therein threaded together with coarse relatively flat pitch threads having an axial clearance whereby to permit a limited predetermined axial movement between said body member and said sleeve element, a screw element helically splined into said sleeve element, clutch means carried in axially slidable relationship by said screw element engageable with said body member, torsion-compression spring means engaged between the sleeve and clutch elements opposing relative rotation between said screw element and said sleeve element and axially spring loading said clutch element into engagement with said body member, and return spring means constantly urging said screw and sleeve elements axially outwardly from said body member, said sleeve element being restrained by the abutment of the top of the coarse relatively flat pitch threads of the sleeve element against the bottom of the mating threads of the body member, said mechanism causing the sleeve element to turn into and out of said body member and adjust the overall length of the tappet upon intermittent application of force axially thereagainst.

3. A self adjusting tappet comprising a body member headed at one end and a sleeve element threaded in the opposite end thereof with coarse relatively flat pitch threads having an axial clearance whereby to permit a limited predetermined axial movement between said body member and said sleeve element, a clutch seat in said body member axially spaced from said threads, a screw element headed at its outer end and helically splined into said sleeve element including clutch means axially slidable thereon, a torsion-compression spring means engaged between the sleeve and clutch elements opposing relative rotation between said screw element and said sleeve element and axially spring loading said clutch element against said clutch seat, and return spring means constantly urging said screw and sleeve elements axially outwardly from said body member, said sleeve element being restrained by the abutment of the top of the coarse relatively flat pitch threads of the sleeve element against the bottom of the mating threads of the body member, said mechanism causing the sleeve element to turn into and out of said body member and adjust the overall length of the tappet upon intermittent application of force axially thereagainst.

4. A self adjusting tappet adapted to maintain a predetermined valve clearance in the valve operating mechanism of an internal combustion engine comprising a body member and a sleeve element threaded therein with coarse relatively flat pitch threads having a predetermined axial thread clearance proportionate to said predetermined valve clearance, a screw element headed at its outer end helically splined into said sleeve element, clutch means carried in axially slidable relationship by said screw element engageable with said body member, torsion-compression spring means engaged between said sleeve and clutch element spring loading said clutch element into engagement with said body member and causing said sleeve element to turn into seated relationship against the head of said screw element responsive to reciprocation of said sleeve element when the valve clearance is greater than the predetermined amount, and return spring means constantly urging said screw and sleeve elements axially outwardly from said body member, reciprocation of said sleeve element within said body member after the sleeve element and the screw element are in seated relationship causing said sleeve element to thread itself inwardly from said body member whenever the said coarse relatively flat pitch thread clearance becomes less than the predetermined amount.

5. A self adjusting tappet adapted to maintain a predetermined valve clearance in the valve operating mechanism of an internal combustion engine comprising a body member and a sleeve element threaded therein with coarse relatively flat pitch threads having a predetermined axial thread clearance therebetween proportionate to said predetermined valve clearance, a screw element headed at its outer end helically splined into said sleeve element, a clutch seat in said body member, clutch means carried in axially slidable relationship by said screw element engageable with said clutch seat, torsion-compression spring means engaged between said sleeve and clutch element seating said clutch element in said body member and causing said sleeve element to seat itself against the head of said screw element responsive to reciprocation of said sleeve element when the valve clearance becomes greater than the predetermined amount, and return spring means constantly urging said screw and sleeve elements axially outwardly from said body member, reciprocation of said sleeve element within said body member after having been seated against the head of said screw element whenever the valve clearance becomes less than the predetermined amount causing said sleeve element to thread itself inwardly from said body member.

6. A self adjusting tappet comprising a body member internally threaded with coarse relatively flat pitch threads at one end thereof having therein a spring chamber, an axially and outwardly disposed clutch face and a clutch chamber disposed inwardly of said internally threaded portion, a sleeve element threaded with mating coarse relatively flat pitch threads into said body member having a predetermined axial thread clearance in respect to the internal threads of said body member, an inner screw element headed at its outer end helically splined into said sleeve element including a clutch element slidably mounted on the inner end thereof, torsion-compression spring means engaged between the opposed ends of said sleeve element and said clutch element constantly urging said clutch element against the clutch face of said body member and normally resiliently opposing relative rotation of said sleeve and screw elements and a return spring seated in the said body member engaging said screw element urging said screw and sleeve elements axially outward of said body member, axial reciprocation of said screw element ratcheting said sleeve element into seated relationship with the head of said screw element to lengthen the tappet whereupon the only axial movement of the tappet becomes that allowable by the axial clearance between the mating coarse threads of the sleeve element and body member, reciprocation of the sleeve element and body member in respect to each other causing said tappet to shorten whenever the screw and sleeve elements are seated in respect to each other and the axial movement between the sleeve element and the body member becomes less than the predetermined mating coarse thread clearance.

7. A self adjusting tappet adapted to maintain a predetermined clearance in the valve operating mechanism of an internal combustion engine comprising a body member headed at one end internally threaded at the other end thereof and having therein a spring chamber, an axially and outwardly disposed clutch face and a clutch chamber disposed inwardly of said internally threaded portion, a sleeve element threaded within said body member having an axial mating thread clearance proportionate to said predetermined valve mechanism clearance, an inner screw element headed at its outer end helically splined into said sleeve element including a clutch element slidably mounted on the inner end thereof, torsion-compression spring means engaged between the opposed ends of said sleeve element and said clutch element constantly urging said clutch element against the clutch face of said body member and resiliently maintaining said sleeve and screw elements in angular alignment about their helical axis, and a return spring seated in the said body member engaging said screw element urging said screw and sleeve elements axially outwardly from said body member, axial reciprocation of said screw and sleeve element relative to each other causing said sleeve element to turn into seated relationship with the head of said screw element to lengthen the tappet whereupon the only axial movement of the tappet becomes that allowable by the axial clearance between the mating threads of the sleeve element and body member, reciprocation of the sleeve element and body member in respect to each other causing said tappet to shorten whenever the screw and sleeve elements are seated in respect to each other and the axial movement between the sleeve element and the body member becomes less than the predetermined mating thread clearance.

References Cited in the file of this patent

UNITED STATES PATENTS

| Number | Name | Date |
| --- | --- | --- |
| 1,443,940 | Anderson | Feb. 6, 1923 |
| 1,613,815 | Anderson | Jan. 11, 1927 |
| 2,259,905 | Moncrieff | Oct. 21, 1941 |
| 2,283,536 | Burkhardt | May 19, 1942 |